United States Patent
Ward

(10) Patent No.: US 7,830,893 B2
(45) Date of Patent: Nov. 9, 2010

(54) REAL TIME SEGMENTATION AND REASSEMBLY OF ASYNCHRONOUS TRANSFER MODE (ATM) ADAPTATION LAYER TWO (AAL2) AND AAL5 DATA

(75) Inventor: Robert Geoffrey Ward, Colorado Springs, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1410 days.

(21) Appl. No.: 10/791,117

(22) Filed: Mar. 2, 2004

(65) Prior Publication Data
US 2005/0195829 A1    Sep. 8, 2005

(51) Int. Cl.
    *H04L 12/56*    (2006.01)
(52) U.S. Cl. ............... 370/395.6; 370/395.3; 370/395.1
(58) Field of Classification Search ................. 370/351, 370/389, 392, 395.1, 395.3, 395.43, 395.6
    See application file for complete search history.

(56) References Cited

U.S. PATENT DOCUMENTS

| | | | | |
|---|---|---|---|---|
| 5,446,726 A | * | 8/1995 | Rostoker et al. | 370/232 |
| 5,550,978 A | * | 8/1996 | Takahashi et al. | 709/236 |
| 5,761,191 A | * | 6/1998 | VanDervort et al. | 370/232 |
| 5,920,561 A | * | 7/1999 | Daniel et al. | 370/395.6 |
| 5,956,344 A | * | 9/1999 | Cole | 370/465 |
| 5,982,783 A | * | 11/1999 | Frey et al. | 370/395.6 |
| 5,999,529 A | * | 12/1999 | Bernstein et al. | 370/376 |
| 6,088,355 A | * | 7/2000 | Mills et al. | 370/392 |
| 6,148,000 A | * | 11/2000 | Feldman et al. | 370/397 |
| 6,490,296 B2 | * | 12/2002 | Shenoi et al. | 370/469 |
| 6,574,224 B1 | * | 6/2003 | Brueckheimer et al. | 370/395.6 |
| 6,621,821 B1 | * | 9/2003 | Song | 370/395.6 |
| 6,625,120 B1 | * | 9/2003 | Pillar et al. | 370/230 |
| 6,654,376 B1 | * | 11/2003 | Stacey et al. | 370/395.21 |
| 6,687,250 B1 | * | 2/2004 | Suzuki et al. | 370/395.65 |
| 6,707,819 B1 | * | 3/2004 | Fraser et al. | 370/395.1 |
| 6,850,520 B1 | * | 2/2005 | Takada et al. | 370/389 |
| 7,054,320 B1 | * | 5/2006 | Lee et al. | 370/395.6 |
| 7,269,175 B2 | * | 9/2007 | Karlsson et al. | 370/395.6 |
| 2001/0024453 A1 | * | 9/2001 | Dekeyser | 370/474 |
| 2002/0141450 A1 | * | 10/2002 | Duvvuru | 370/476 |
| 2002/0146010 A1 | * | 10/2002 | Shenoi et al. | 370/395.1 |
| 2003/0088685 A1 | * | 5/2003 | Lee | 709/230 |
| 2003/0105799 A1 | * | 6/2003 | Khan et al. | 709/201 |
| 2003/0152076 A1 | * | 8/2003 | Lee et al. | 370/389 |
| 2003/0231635 A1 | * | 12/2003 | Kalkunte et al. | 370/395.42 |
| 2004/0213206 A1 | * | 10/2004 | McCormack et al. | 370/352 |

FOREIGN PATENT DOCUMENTS

CN    1529478    9/2004

* cited by examiner

*Primary Examiner*—Aung S Moe
*Assistant Examiner*—Curtis A Alia
(74) *Attorney, Agent, or Firm*—Matthew A. Pequignot; Pequignot + Myers LLC

(57) ABSTRACT

A system for reassembling asynchronous transfer mode (ATM) data in real time is disclosed. In one embodiment, the system for reassembling ATM data in real time comprises a circular buffer for storing ATM data, the ATM data comprising information divided into cells, and a plurality of parallel processing elements configured to analyze the ATM cells and determine a cell type, wherein ATM adaptation layer (AAL) 2 cells and AAL 5 cells are reassembled in real-time.

24 Claims, 7 Drawing Sheets

# REAL TIME SEGMENTATION AND REASSEMBLY OF ASYNCHRONOUS TRANSFER MODE (ATM) ADAPTATION LAYER TWO (AAL2) AND AAL5 DATA

BACKGROUND

Asynchronous transfer mode (ATM) is a communication protocol that has continually gained in popularity and continues to be used as the preferred communication protocol for high-speed fiber optic-based communication networks. ATM is a packet-based communication protocol that communicates by transmitting and receiving packets, referred to as "cells." Each ATM cell comprises a header portion and a payload portion. The header portion comprises five bytes (also referred to as "octets") of information and the payload portion comprises 48 octets. The header portion contains information that defines the type of ATM cell and the payload. In some instances, the payload portion of multiple cells is combined (typically by concatenation) to form a larger packet. Such an example is ATM adaptation layer 5 (AAL5), in which a number of cells having like header information have their payload concatenated to form a larger packet. Generally, ATM is a connection-oriented protocol, which employs what is referred to as a "virtual channel connection" (VCC), over which communication data traverses between network endpoints, which are referred to as "customer premises equipment" (CPE).

Generally, in ATM, a segmentation and reassembly (SAR) function is performed to segment the communication data into ATM cells at the source end and to reassemble the ATM cells into communication data at the destination end.

Unfortunately, segmentation and reassembly of ATM data requires significant processing resources and is difficult to perform in real-time. This situation is particularly troublesome when attempting to test, troubleshoot and gather statistics in an ATM network.

Therefore, it would be desirable to have a way to accelerate the processing of ATM data during cell segmentation and reassembly.

SUMMARY

Embodiments of the invention include a system for reassembling asynchronous transfer mode (ATM) data in real time, comprising a circular buffer for storing ATM data, the ATM data comprising information divided into cells, and a plurality of parallel processing elements configured to analyze the ATM cells and determine a cell type, wherein ATM adaptation layer (AAL) 2 cells and AAL 5 cells are reassembled in real-time.

Other systems, methods, computer readable media, and features of the invention will be or become apparent to one with skill in the art upon examination of the following drawings and detailed description. It is intended that all such additional systems, methods, computer readable media, and features, be included within this description, be within the scope of the present invention, and be protected by the accompanying claims.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the present invention.

DETAILED DESCRIPTION

The system for reassembling asynchronous transfer mode (ATM) data in real time in accordance with embodiments of the invention can be implemented in software (e.g., firmware), hardware, or a combination thereof. In one embodiment, the system for reassembling ATM data in real time is implemented primarily using a combination of hardware and software, in which executable code is executed in a field programmable gate array (FPGA). However, regardless of the manner of implementation, the software portion of the system for reassembling ATM data in real time can be executed by a special or general-purpose computer, such as a personal computer (PC; IBM-compatible, Apple-compatible, or otherwise), workstation, minicomputer, or mainframe computer. Furthermore, the system for reassembling asynchronous transfer mode (ATM) data in real time may be implemented in other processing or computing devices, such as, for example but not limited to, a dedicated processor.

Figure 1:
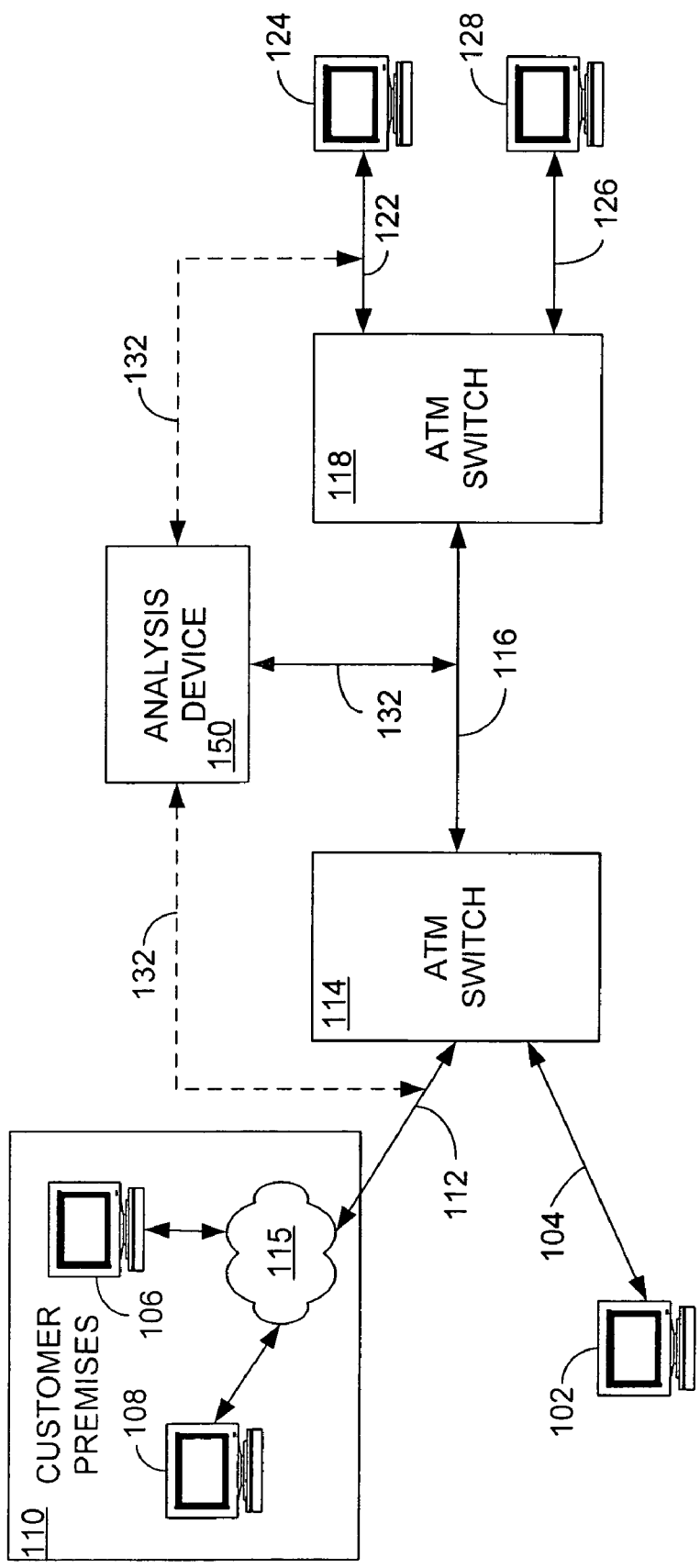
FIG. 1 is a block diagram illustrating an exemplary asynchronous transfer mode (ATM) network in which an analysis device including the system for reassembling ATM data in real time resides.

FIG. 1 is a block diagram illustrating an exemplary asynchronous transfer mode (ATM) network 100 in which an analysis device 150 including the system for reassembling ATM data in real time resides. The network 100 comprises an ATM switch 114 coupled to an ATM switch 118 via connection 116. The ATM switches 114 and 118 operate to route ATM traffic over connection 116 per the ATM communication standard. The connection 116 is referred to a network node interface (NNI). As known in the art, the NNI 116 couples two or more ATM switches to form an ATM communication network. Customer premises equipment (CPE) 102 is coupled to the ATM switch 114 via connection 104. Connection 104 is referred to as a user network interface (UNI), and can comprise many different communication channels. For example, a UNI can be any communication channel over which a customer location communicates with an ATM switch, and can be, for example, a digital subscriber line (DSL), a coaxial connection for a cable modem, a T1 communication channel, an optical, or a wireless connection, etc. Customer premises location 110 includes customer premises equipment 106 and 108 coupled to the ATM switch 114 via connection 112. Connection 112 is also a user network interface (UNI). Further, in this example, the customer premises equipment 106 and 108 is coupled via a local area network (LAN) 115.

Similarly, customer premises equipment 124 is connected to ATM switch 118 via UNI connection 122 and customer premise equipment 128 is connected to ATM switch 118 via UNI connection 126. In accordance with an embodiment of the invention, an analysis device 150 including the system for reassembling ATM data in real time, also referred to as "segmentation and reassembly logic" (to be described below), is coupled to any of the UNI connections or to the NNI connection 116 via connection 132, which can be an optical fiber. As known to those skilled in the art, the various user network interface connections and network node interface connections can be carried via different physical media, such as those complying with plesiochronous digital hierarchy (PDH) or synchronous digital hierarchy (SDH) standards. Several different standards exist that define the manner in which the physical layer interface of an ATM communication network is performed. Numerous media, physical layers, protocols and services may co-exist within the same infrastructure to transport ATM cells, and all are included in this description. This implies that there are connection oriented and connectionless types of data that co-exist in parallel. ATM is designed to support all of these data types.

An ATM network also makes use of what are referred to as "virtual circuits" to transport information. A virtual circuit (VC) is defined using what is referred to as a "virtual channel connection" (VCC). A VCC is established between any source and any destination in an ATM network, regardless of the way that data is being routed across the network. For example, customer premises equipment 124, 128, 102, 106, and 108 are considered "endpoints," any of which can be a source or a destination of data in the form of ATM traffic. Fundamentally, ATM is a connection oriented technology. A connection is established by signaling, i.e., by transmitting a setup request which traverses the network from the source to the destination endpoint. If the destination endpoint agrees to form a connection, a VCC is established between the two endpoints. A mapping is defined between the virtual channel identifiers (VCI)/virtual path identifiers (VPI) of both UNIs associated with the source and destination endpoints, and between the appropriate input link and the corresponding output link of any intermediate switches, such as ATM switches 114 and 118. A VCC is a connection between two communicating ATM endpoints. It may comprise a concatenation of several ATM VC links using inverse multiplexing over ATM (IMA). All communication within the ATM network proceeds along the same VCC, which preserves cell sequence and provides a certain quality of service. The virtual channel identifier (VCI) in the ATM cell header (to be described below) is assigned per network entity-to-entity link, i.e., it may change across the network within the same VCC.

A virtual path (VP) groups multiple VCs carried between two ATM entities and may also involve many ATM VP links. The VC's associated with a VP are globally switched without unbundling or processing the individual VC or changing its VCI. Thus, the cell sequence of each VC is preserved and the quality of service of the VP depends on that of its most demanding VC. As the cell address mechanism uses both the VCI and the VPI, different VP's may also use the same VCI without conflict.

Figure 2A:
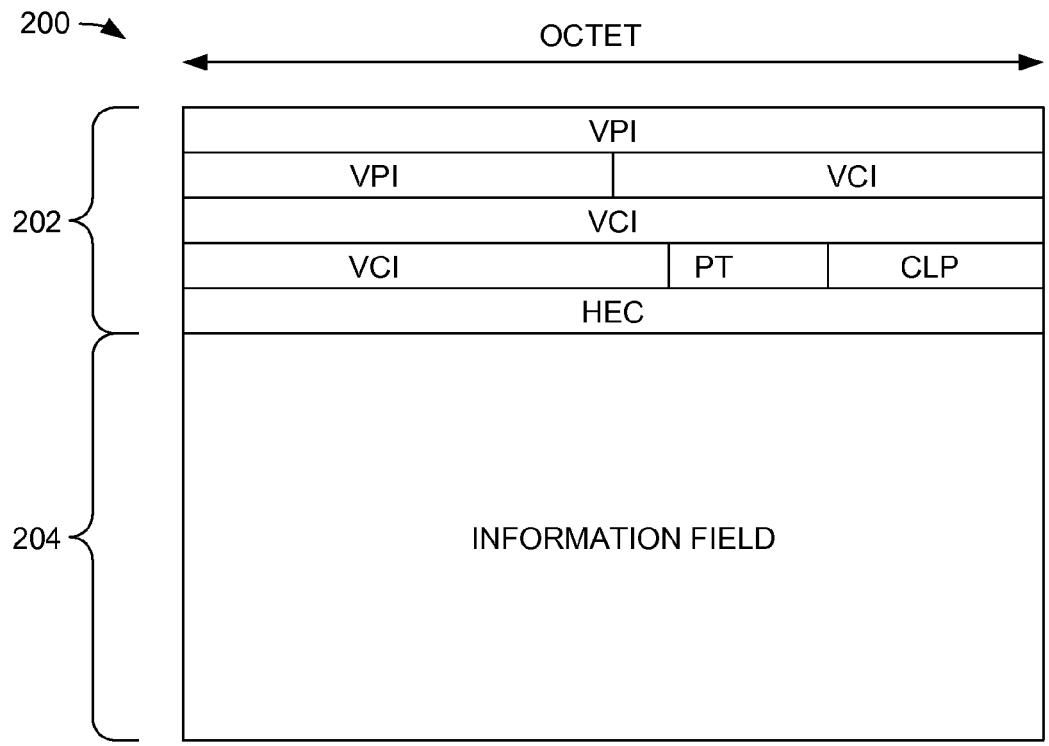
FIG. 2A is a block diagram illustrating an exemplary ATM cell.

FIG. 2A is a block diagram illustrating an exemplary ATM cell 200. The ATM cell 200 comprises a five byte header portion 202 and a 48 byte payload portion 204. The 48 byte payload portion 204 is also referred to as the information field. The first byte in the header 202 comprises the virtual path identifier (VPI) in the case of an NNI connection, or generic flow control (GFC) plus VPI in the case of a UNI connection. A first portion of four bits of the second byte also comprises the virtual path identifier, while the second portion of four bits of the second byte comprises the virtual channel identifier (VCI). The third byte in the header 202 also comprises the virtual channel identifier, as does a first portion of four bits of the fourth byte. A second portion of three bits of the fourth byte in the header 202 comprises a payload type (PT) indicator (PTI), while a third portion of one bit of the fourth byte comprises a cell loss priority (CLP) bit. The fifth byte of the header 202 comprises the header error correction (HEC) byte. With regard to an ATM cell, a byte is also referred to as "octet."

Figure 2B:
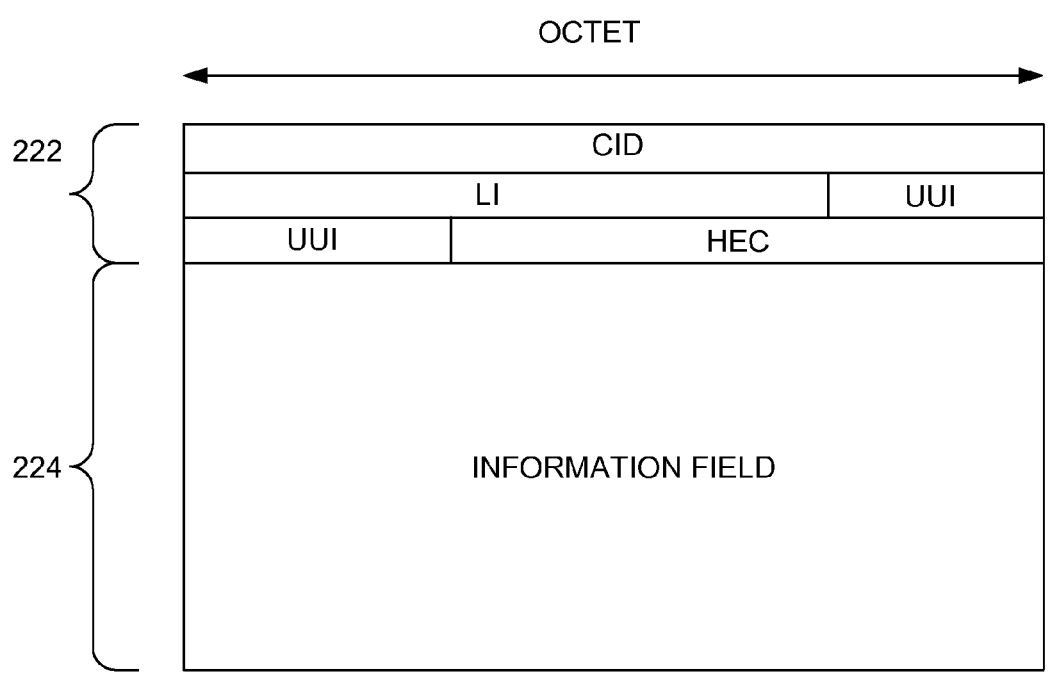
FIG. 2B is a block diagram illustrating an exemplary ATM mini-cell.

FIG. 2B is a block diagram illustrating an exemplary ATM mini-cell 290. A mini-cell is a structure that is particular to AAL2. The mini-cell 290 resides within an ATM cell payload portion 204 and can span two or more ATM cells. The ATM mini-cell 220 includes a header portion 222 and a payload portion 224. The first byte in the header portion 222 contains the channel identifier (CID). The first portion of the second byte contains the length indicator (LI). The second portion of the second byte plus the first portion of the third byte contain part of the user-user indicator (UUI). The second portion of the third byte contains a header error correction field (HEC), which is different from the ATM cell HEC.

ATM is a layer-based architecture. In terms of the ATM protocol stack, the ATM layer resides above the physical layer. The ATM layer provides cell transfer for all services and includes the ATM adaptation layer (AAL). The ATM adaptation layer provides service dependant functions to the layers above the AAL layer. ATM is a packet switching technology that directs traffic using identifiers (VPI/VCI) contained in the header 202. However, unlike other packet technologies, ATM uses short, fixed length packets called cells. As described above, typically each cell is 53 bytes long. Inserting payload data into the 48 byte payload portion 204 is accomplished by the AAL. The AAL provides ATM the flexibility to carry different types of services within the same format. It should be understood that AAL is not a network process, but instead is performed by the network terminating equipment. Thus, the network's task is to route a cell from one point to another, depending on its header information. Two ATM adaptation layer distinctions are of particular interest here. ATM adaptation layer type two (AAL2) provides variable bit rate (VBR) timing sensitive services. AAL2 is used to transport traffic where a strong timing relationship between the source and the destination is required, but in which the bit rate may vary. Examples include variable bit rate voice and compressed, for example using motion picture experts group (MPEG) coded video.

ATM adaptation layer type 5 (AAL5) also refer to as a "simple and efficient adaptation layer (SEAL)," is design to meet the requirements of local, high speed LAN implementations. AAL5 is used for connectionless or connection oriented VBR services.

AAL5 is a format whereby one to n cells having like VPI/VCI have their payloads concatenated to form a larger packet. AAL2 is a format whereby within the AAL2 format, there are multiple mini-cells. Multiple mini cells having like VPI/VCI and channel identifier (CID) have their payload concatenated to form a larger packet. As will be described in detail below, the segmentation and reassembly logic 300 to be described below in FIG. 3, distinguishes between AAL2 cells and AAL5 cells, and reassemblies these cells in real time at network speeds approaching and exceeding optical carrier (OC) 12 speed (i.e., a line rate of 622.080 megabits per second (Mbps)).

Figure 3:
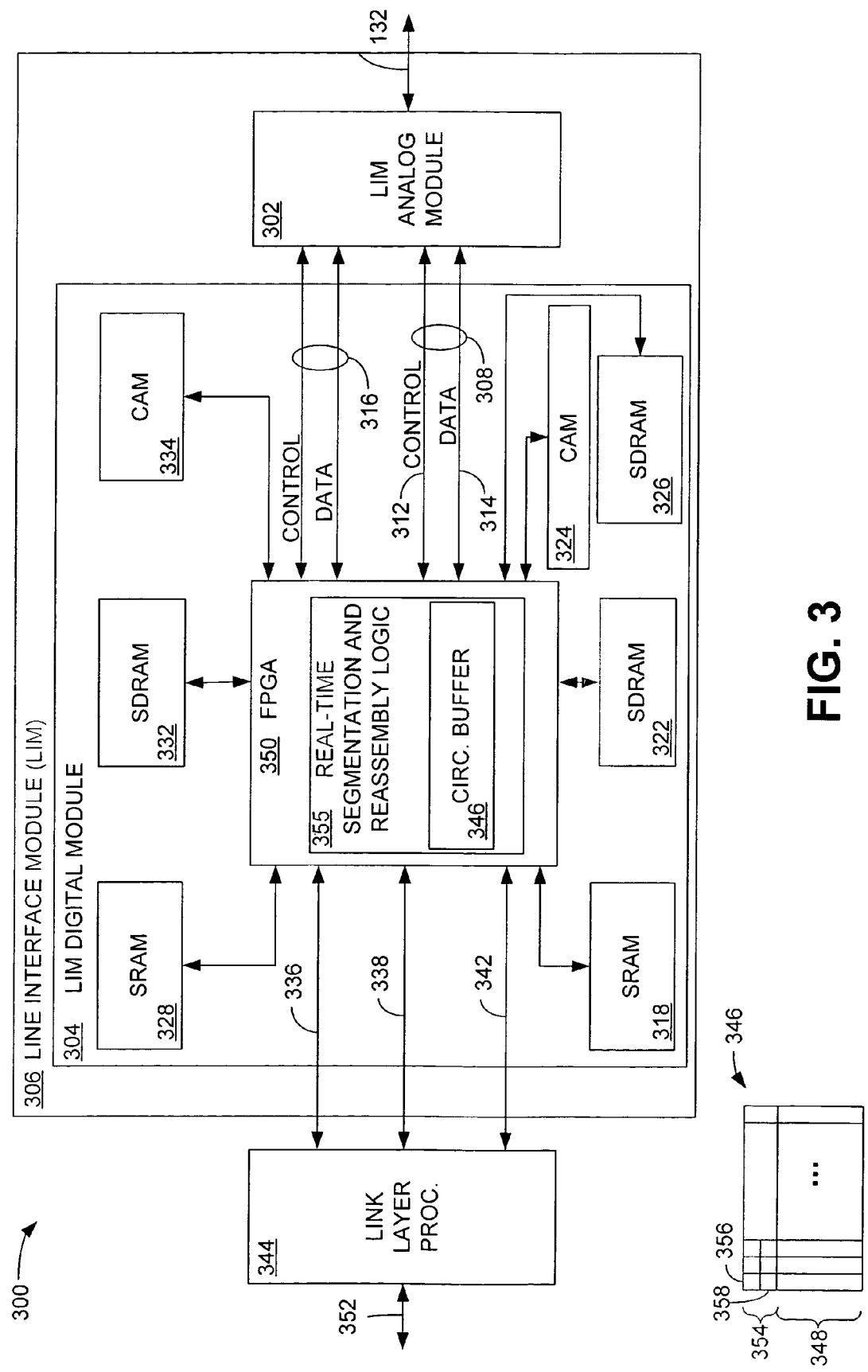
FIG. 3 is a block diagram illustrating the segmentation and reassembly (SAR) logic executed by the analysis device of FIG. 1.

FIG. 3 is a block diagram illustrating the segmentation and reassembly (SAR) logic 300 executed by the analysis device 150 of FIG. 1. The segmentation and reassembly logic 300 comprises, in this embodiment, a line interface module (LIM)

306 including at least one LIM analog module 302 and a LIM digital module 304. As referred to herein, a "module" can be a printed circuit card, or wiring board. Although shown as a specific implementation in FIG. 3, the segmentation and reassembly logic comprises executable software that can be executed in any processor. The LIM analog module 302 receives ATM cells from connection 132, which can be an optical fiber.

A plurality of LIM analog modules 302 will typically be located with one LIM digital module 304 on a LIM interface module 306. However, for simplicity of illustration, a single LIM analog module 302 is illustrated having a plurality of connections to a field programmable gate array (FPGA) 350 on the LIM digital module 304. For example, connections 308 and 316 are shown between the LIM analog module 302 and the FPGA 350. Each connection 308 and 316 includes control information and data. For example, on connection 308, connection 312 carries control information while connection 314 carries data in the form of ATM cells.

The real-time segmentation and reassembly logic 355 is executed in the FPGA 350, which includes a number of different external and embedded memory modules. For example, the real-time segmentation and reassembly logic 355 includes an embedded memory portion that contains a circular buffer 346, which will be explained below. However, for ease of description, the circular buffer 346 is shown external to the FPGA 350. Similarly, for simplicity of illustration, other memory modules associated with the FPGA 350 are shown external to the FPGA. For example, FPGA 350 includes a static random access memory (SRAM) element 318, a synchronous dynamic random access memory (SDRAM) 322 and a content addressable memory (CAM) 324. The size and configuration of the CAM is variable. For example, a configuration of 8192×64 bits may be chosen. The memory elements 318, 322, and 324 process and store the data present on connection 314.

Similarly, the data contained on connection 316 is processed by the SRAM 328, the SDRAM 332, and the CAM 334, which are also associated with the FPGA 350. In addition, an additional SDRAM element 326 is also associated with the FPGA 350.

The circular buffer 346 comprises memory space 348 for 32 ATM cells plus a "context field" 354 for each cell 348. The context field 354 comprises information about the cell in an information field 356 and comprises information about data fragments contained in the cell. This memory location is referred to as the fragmentation table 358. In this example, the fragmentation table 358 may contain up to six fragments although an AAL2 cell may, theoretically, have up to 11 mini-cells. However, is unlikely that an AAL2 cell contain more than six fragments. The size of the fragmentation table 358 is variable.

The FPGA 350 is coupled to a link layer processor 344 via connection busses 336, 338, and 342. The bus 336 carries central processor unit (CPU) information, while the line interface module BUS1 is referred to as connection 338 and the line interface module BUS2 is referred to as connection 342.

The link layer processor 344 analyzes frames and cells from the line interface module 306 and supplies a signal via connection 352 to, for example, a personal computer to display the ATM information.

Figure 4:
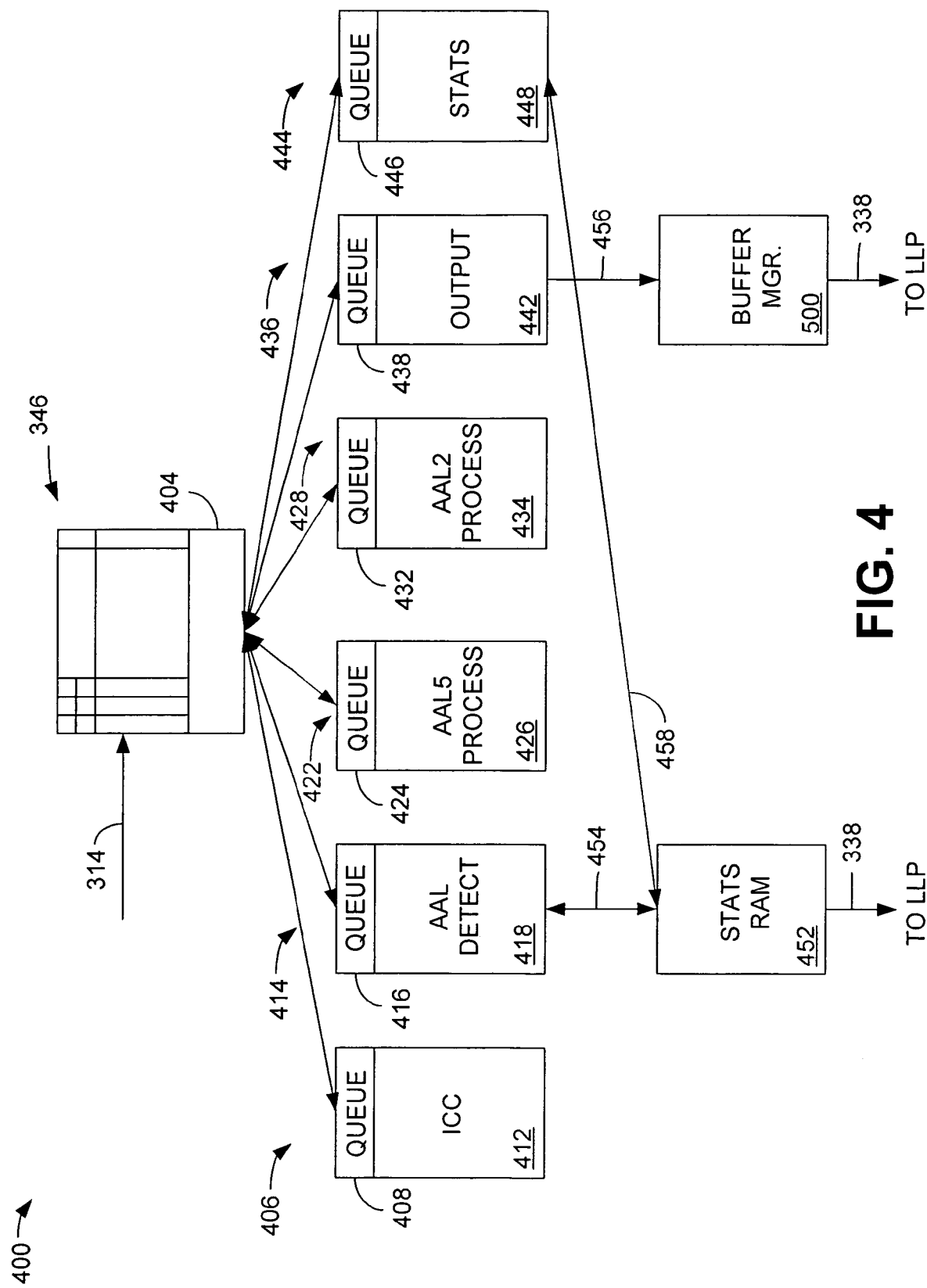
FIG. 4 is a block diagram illustrating the operation of the segmentation and reassembly logic contained in the FPGA of FIG. 3.

FIG. 4 is a block diagram illustrating the operation of the real-time segmentation and reassembly logic 355. The block diagram 400 includes a circular buffer 346 and an access arbitrator 404. As will be described below, the access arbitrator 404 controls the exchange of information between the circular buffer 346 and a number of processing elements to be described below. The parallel processing elements comprise an initial cell check (ICC) element 412, an AAL detect element 418, an AAL5 processing element 426, an AAL2 processing element 434, an output element 442, and a statistics element 448. Further, a statistics RAM element 452 is coupled to the AAL detect element 418 via connection 454 and to the statistics elements 448 via connection 458. A buffer manager 500 is coupled to the output element 442 via connection 456.

Each of the elements 412, 418, 426, 434, 442, and 448 includes a queue mechanism 408, 416, 424, 432, 438, and 446, respectively. Each queue mechanism 408, 416, 424, 432, 438, and 446 comprises two counters. A first counter is referred to as a "head pointer" and the other counter is referred to a "tail pointer." The head pointer points to the latest cell written into the circular buffer 346 and having been processed by the previous processing element. The tail pointer points to the current cell being processed by the respective parallel processing element. When a cell is processed by one of the processing elements 412, 418, 426, 434, 442 or 448, it queues the subject cell onto the next processing element. Simultaneously, the processing element is allowed to process the next cell as long as there is a cell waiting in the circular buffer.

Incoming cells from the LIM analog module 302 are provided via connection 314 to the circular buffer 346. The access arbitrator 404 controls communication between the circular buffer 346 and the processing elements 412, 418, 426, 434, 442, and 448.

The statistics RAM 452 stores information and statistics regarding, in this example, up to 8000 unique VPI/VCI pairs, and allows software (not shown) in the link layer processor 344 (FIG. 3) to access and transmit the statistics information associated with the contents of the statistics RAM 452 to a personal computer (PC), or other terminal, for display.

The initial cell check (ICC) element 412 examines an incoming cell in the circular buffer 346 and determines ATM level information, such as, PTI, CLP, HEC errors, type of cell, VPI/VCI, and an index that is assigned to the cell which is used as a reference for gathering statistics about the cell. The index is a number corresponding to a memory address in the CAM 324 (FIG. 3) The index is a tracking mechanism, such as a label, that the real-time segmentation and reassembly logic 355 uses to associate equivalent VPI/VCIs and VPI/VCI+CID without using the entire bit field of the VPI/VCI or VPI/VCI+CID. The CAM 324 (FIG. 3) can be thought of as a memory in reverse. Data goes in and an address comes out. This address is what is referred to as the index. The index is obtained from the CAM 324 whenever a unique VPI/VCI or VPI/VCI+CID is identified and added to the CAM 324. Indices (CAM addresses) are incrementally allocated. Additionally VPI/VCI entries can be entered into the CAM by the user via software (not shown). The index is placed in the circular buffer 346 in the context portion 354 (FIG. 3). Presenting the VPI/VCI of the cell being analyzed to the CAM 324 triggers a return of either the index of that VPI/VCI or the addition of the VPI/VCI to the CAM 324, which returns an index defining the location at which the VPI/VCI was placed.

The AAL detect element 418 examines the PTI, the cell type, the mini cell HEC, and the statistics RAM entry for that index to determine the AAL mode, if any, of the cell being analyzed. The AAL mode may have been entered via software or was previously determined by examination of earlier cells. If an AAL2 or an AAL5 cell is detected, the AAL detect element 418 tags the cell as either AAL2 or AAL5.

The AAL5 processing element 426 examines only AAL5 data tagged as cells in information field 356 in the context portion of the circular buffer 346 (FIG. 3). The AAL5 processing element 426 determines whether the cell is a "start," "continuation," or "end" of a packet and forms an entry in the fragmentation table 358 with that information. The AAL5 processing element 426 also performs a cyclic redundancy check (CRC) 32 calculation on each frame.

The AAL2 processing element 434 examines only AAL2 data tagged as cells in information field 356 in the context portion of the circular buffer 346 (FIG. 3) and determines whether a mini-cell is the "start," "continuation," or "end" packet and forms an entry in the fragmentation table 358 with that information. The AAL2 processing element 434 also performs VPI/VCI+CID look up in the CAM 324 (FIG. 3) to determine a secondary index to track and match mini-cells of like VPI/VCI+CID. The AAL2 processing element 434 can create more than one entry in the fragmentation table 358 if more than one mini cell is present in a cell.

The output element 442 examines the entries in the fragmentation table 358 and reads the appropriate blocks of payload information from the cell data 348 in the circular buffer 346 (FIG. 3) and passes the payload information to the buffer manager 500 via connection 456. The output element 442 also calculates a running frame length for each frame and passes the frame length information to the LLP 344 (FIG. 3) with the payload data.

The statistics element 448 examines each entry in the fragmentation table 358 and counts the number of idle cells, unassigned cells, operation and maintenance (OAM) cells, resource management (RM) cells, HEC errored cells, CLP=1 cells, congested cells, AAL5 frames, AAL5 CRC errors, AAL5 byte count, AAL2 frames, and AAL2 byte count. The statistics element 448 performs this analysis for all frames and also on a per VPI/VCI basis. The information in the statistics element 448 is passed to the statistics RAM 452, as described above.

The buffer manager 500 accumulates cells and/or mini cells of like VPI/VCI or VPI/VCI+CID (via the index). When a frame is complete the buffer manager 500 outputs the frame as a complete frame to a downstream processor, such as the link layer processor 344 of FIG. 3.

Figure 5:
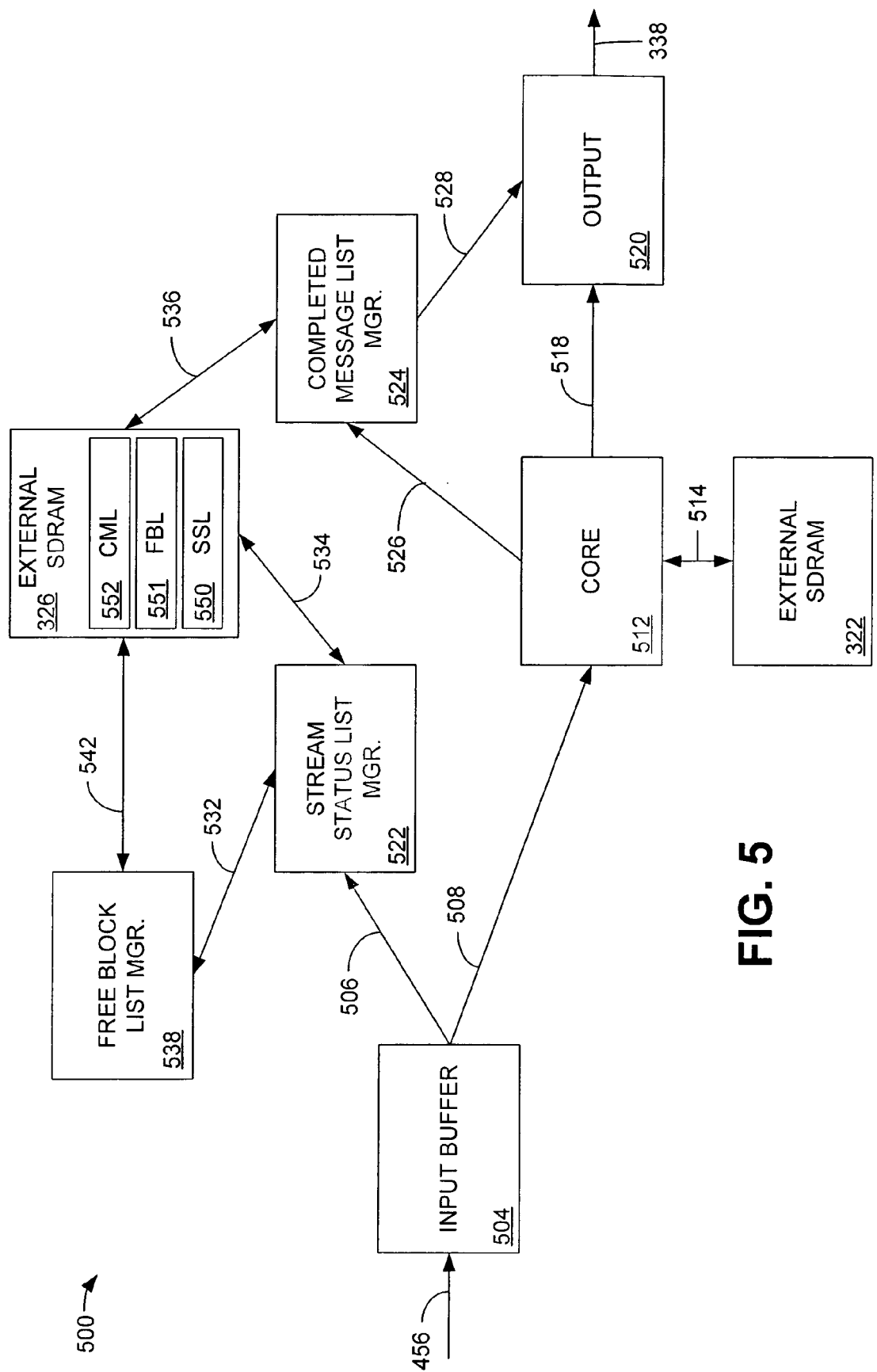
FIG. 5 is a block diagram illustrating the operation of the buffer manager of FIG. 4.

FIG. 5 is a block diagram 500 illustrating the operation of the buffer manager of FIG. 4. The stream status list (SSL) 550, free block list (FBL) 551 and the completed message list (CML) 552 are lists that are maintained in the external SDRAM 326. These lists are managed by the SSL manager 522, FBL manager 538 and the CML manager 524, respectively. The input buffer 504 receives a cell or fragment via connection 456 from the output element 442 of FIG. 4. The stream status list manager 522 determines whether the cell or fragment is the start of a new frame or the continuation of an existing frame via connection 506. If the stream status list manager 522 determines that the cell or fragment is a new frame, a buffer number is obtained from the free block list manager 538 and the buffer number is saved in the SSL 550 for that index. If the stream status list manager 522 determines that the cell or fragment is a continuation, then, the existing buffer is obtained from the stream status list 550. The core 512 writes the data to the allocated buffer within the external SDRAM 322. The external SDRAM 322 is partitioned into many buffers, each large enough to hold one frame.

If the core 512 determines that an entire frame has been written, then the core 512 adds a message to the CML 552 via the completed message list manager 524. The completed message list manager 524 informs the output element 520 that a frame is waiting to be output. The output element 520 accesses the frame via the core 512 and outputs the frame via connection 338 to the link layer processor 344 of FIG. 3.

Figure 6A:
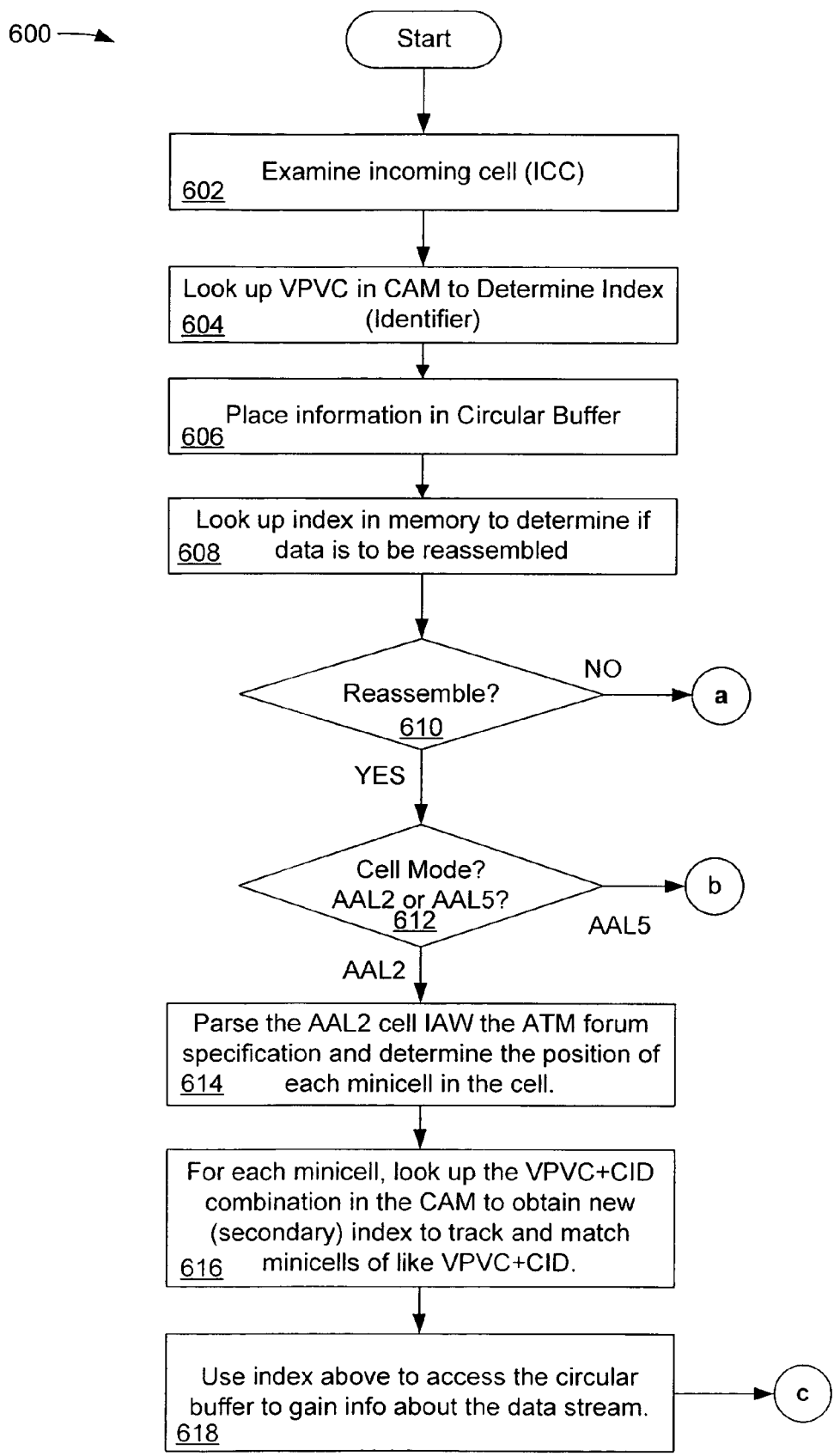
FIGS. 6A and 6B are a flow chart collectively illustrating the operation of one embodiment of the segmentation and reassembly logic.
Figure 6B:
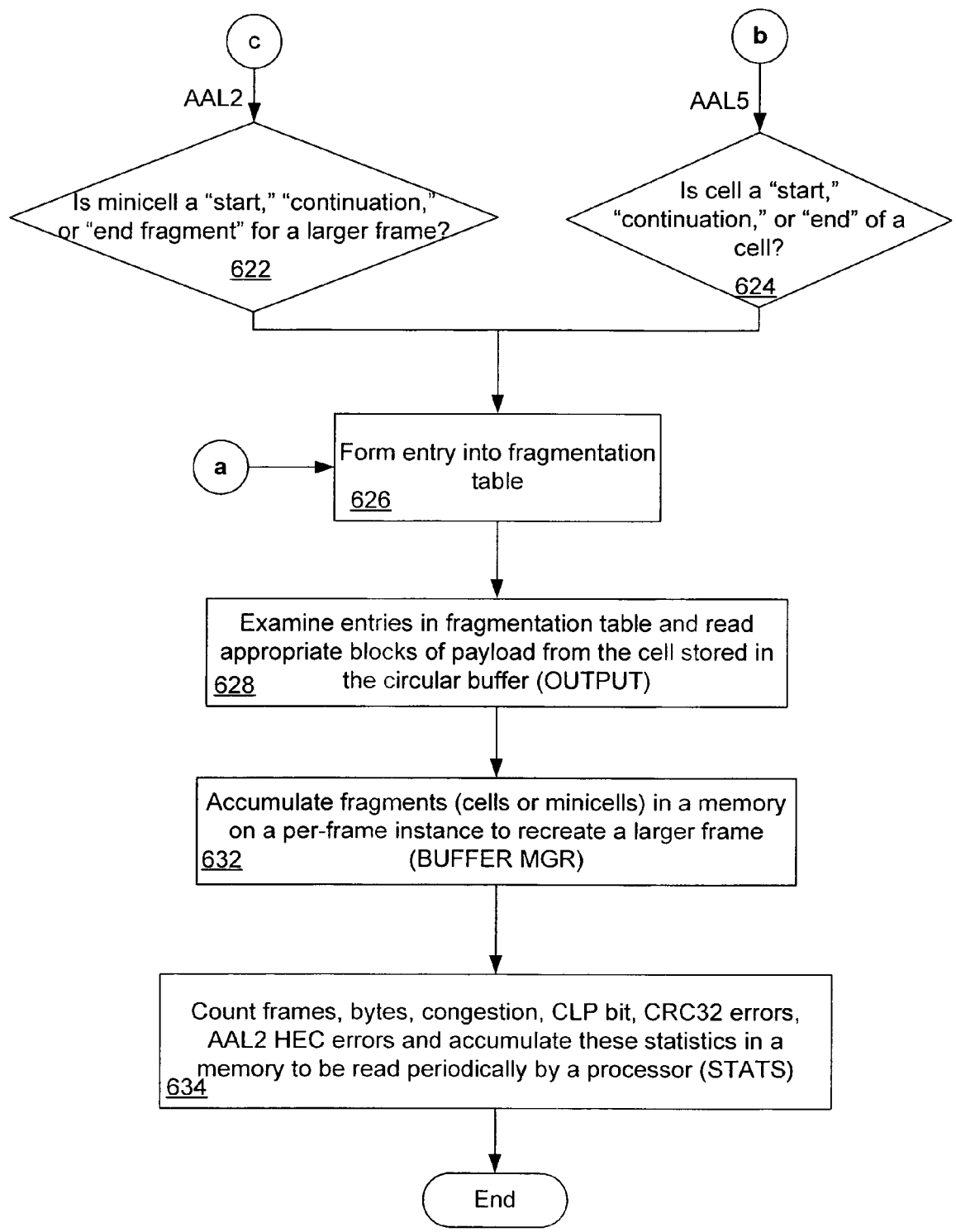

FIG. 6A and 6B are a flow chart 600 collectively illustrating the operation of one embodiment of the real-time segmentation and reassembly logic 355. The blocks in the flowchart 600 can be performed in the order shown on a particular cell, and can be performed in parallel on more than one cell simultaneously. Further, the blocks may be performed out of the order shown or in parallel.

In block 602 an incoming cell in the circular buffer 346 is examined by the ICC element 412 (FIG. 4). In block 604, the VPI/VCI of the cell is discovered in the CAM 324 to determine the index identifier. In block 606 the cell-specific added information is placed into the circular buffer 356.

In block 608, the AAL detect element 418 uses the index from the CAM 324 to query the memory to determine whether the cell is to be reassembled. In block 610 a decision is made depending on whether the data is to be reassembled. If the data is not to be reassembled, for example, if the cell was considered to be idle, unassigned, an OAM cell, etc., then this cell bypasses the AAL5 and AAL2 reassembly processing elements and proceed directly to block 626 (FIG. 6B). A fragment is generated for the entire cell with attributes of being both "start" and "end." The fragment is then processed in block 628 (FIG. 6B) by the output element 520 (FIG. 4). If it is determined in block 610 that the cell is to be reassembled, then, in block 612, the AAL detection element 418 determines the cell mode. If the cell is an AAL2 cell, in block 614 the AAL2 processing element 434 (FIG. 4) parses the AAL2 cell in accordance with ATM forum specifications and determines the position of each mini cell in the cell.

In block 616, for each mini cell, the AAL2 processing element 434 (FIG. 4) looks up the VPI/VCI+CID combination in the CAM 324 to obtain a new (secondary) index to track and match mini cells having like VPI/VCI+CID. In block 618, the index discovered in block 616 is used to access the circular buffer 346 (FIG. 3) to gain information about the cell. In block 622, it is determined whether the mini cell is a "start," "continuation," or "end fragment" for a larger frame. In block 626, an entry is formed in the fragmentation table 358.

If, in block 612 it was determined that the cell was an AAL5 cell, then, in block 624 it is determined whether the cell is a "start," "continuation," or "end" cell. In block 626 an entry is made in the fragmentation table 358 with the information discovered in block 622 or 624.

In block 628, the output element 442 examines entries in the fragmentation table 358 and reads the appropriate blocks of payload from the cell stored in the circular buffer 346 (FIG. 3). In block 632, the buffer manager 500 accumulates fragments of cells or mini cells in a RAM on a per frame instance basis to recreate a larger frame. The RAM in block 632 is divided into, for example, 16384 buffers of 2048 bytes each. Each buffer can accumulate fragments to form one frame. This buffer can be reused when the frame is forwarded to the LLP 344 (FIG. 3). Multiple frames can coexist in multiple buffers in the RAM corresponding to the same VPI/VCI, or index. In block 634, the statistics element 448 collects and provides the above-mentioned statistics to the statistics RAM 452, for output to the link layer processor 344 of FIG. 3.

It will be apparent to those skilled in the art that many modifications and variations may be made to the preferred embodiments of the present invention, as set forth above, without departing substantially from the principles of the present invention. For example, the system for reassembling asynchronous transfer mode data in real time can be used in any ATM communication environment. All such modifications and variations are intended to be included herein within the scope of the present invention, as defined in the claims that follow.

What is claimed is:

1. A system for reassembling asynchronous transfer mode (ATM) data in real time, comprising:
 a circular buffer for storing ATM data, the ATM data comprising frames of information divided into ATM cells comprising at least one of virtual path identifier (VPI) information, virtual channel identifier (VCI) information and channel identifier (CID) information; and
 a content addressable memory configured to receive any of the VPI, VCI and CID information related to each ATM cell and configured to provide an index when particular VPI, VCI and CID information is identified, the index corresponding to unique VPI/VCI combinations for ATM Adaptation layer (AAL)2 cells and VPI/VCI+CID combinations for AAL 5 cells, wherein the index corresponding to each ATM cell is placed in the circular buffer in the context portion of the ATM cell; and
 a plurality of parallel processing elements configured to analyze the ATM cells, to determine a cell type using the index, and to determine the ATM adaptation layer (AAL) mode if any of each cell, wherein AAL2 cells and AAL 5 cells are reassembled in real-time into the frames of the ATM data.

2. The system of claim 1, wherein the circular buffer communicates with the plurality of parallel processing elements simultaneously.

3. The system of claim 2, further comprising a fragmentation table configured to receive and store data fragments associated with an ATM cell.

4. The system of claim 3, further comprising a buffer manager configured to accumulate the data fragments and assemble the data fragments into a frame.

5. The system of claim 4, further comprising a statistics memory configured to store statistics associated with the cells.

6. The system of claim 5, wherein the statistics are chosen from an idle cell, an unassigned cell, an operation and maintenance (OAM) cell, an AAL 2 cell, an AAL 5 cell, a header error correction (HEC) error cell, a frame count, a byte count, congestion information, AAL5 CRC error count, and resource management (RM) cell count.

7. The system of claim 6, wherein the statistics are gathered for each unique VPI/VCI cell stream.

8. The system of claim 7, wherein the statistics are periodically provided to a processor for display.

9. A method for reassembling asynchronous transfer mode (ATM) data in real time, comprising:
 providing ATM data to a circular buffer, the ATM data comprising information divided into ATM cells comprising at least one of virtual path identifier (VPI) information, virtual channel identifier (VCI) information and channel identifier (CID) information;
 receiving in a content addressable memory any of the VPI, VCI and CID information related to each ATM cell;
 storing the ATM data in the circular buffer;
 providing an index when particular VPI, VCI and CID information is identified, the index corresponding to unique VPI/VCI combinations for ATM Adaptation Layer (AAL) 2 cells and VPI/VCI+CID combinations for AAL 5 cells, wherein the index corresponding to each ATM cell is placed in the circular buffer in the context portion of that ATM cell; and
 analyzing the ATM cells to determine a cell type using the index, and to determine the ATM adaptation layer (AAL) mode if any of each cell, wherein AAL2 cells and AAL 5 cells are reassembled in real-time into the frames of the ATM data.

10. The method of claim 9, further comprising simultaneously communicating between the circular buffer and a plurality of processing elements.

11. The method of claim 10, further comprising receiving and storing data fragments associated with an ATM cell in a fragmentation table.

12. The method of claim 11, further comprising:
 accumulating the data fragments in a buffer manager; and
 assembling the data fragments into a frame.

13. The method of claim 12, further comprising storing statistics associated with the cells in a statistics memory.

14. The method of claim 13, wherein the statistics are chosen from an idle cell, an unassigned cell, an operation and maintenance (OAM) cell, an AAL 2 cell, an AAL 5 cell, a header error correction (HEC) error cell, a frame count, a byte count, congestion information, AAL5 CRC error count, and resource management (RM) cell count.

15. The method of claim 14, wherein the statistics are gathered for each unique VPI/VCI cell stream.

16. The method of claim 15, further comprising periodically providing the statistics to a processor for display.

17. A non-transitory computer readable medium having a program stored thereon, said program causing a computer executing said program to reassemble frames of asynchronous transfer mode (ATM) data in real time, said program comprising:
 logic for providing ATM data to a circular buffer, the ATM data comprising information divided into ATM cells, the ATM cells comprising at least one of virtual path identifier (VPI) information, virtual channel identifier (VCI) information and channel identifier (CID) information;
 logic for receiving in a content addressable memory any of the VPI, VCI and CID information related to each ATM cell;
 logic for storing the ATM data in the circular buffer;
 logic for providing an index when particular VPI, VCI and CID information is identified, the index corresponding to unique VPI/VCI combinations for ATM Adaptation Layer (AAL) 2 cells and VPI/VCI+CID combinations for AAL 5 cells, wherein the index corresponding to each ATM cell is placed in the circular buffer in the context portion of the ATM cell; and
 logic for analyzing the ATM cells to determine a cell type using the index, and to determine the ATM adaptation layer (AAL) mode if any of each cell, wherein AAL2 cells and AAL 5 cells are reassembled in real-time into the frames of the ATM data.

18. The non-transitory computer readable medium of claim 17, further comprising logic for simultaneously communicating between the circular buffer and the plurality of processing elements.

19. The non-transitory computer readable medium of claim 18, further comprising logic for receiving and storing data fragments associated with an ATM cell in a fragmentation table.

20. The non-transitory computer readable medium of claim 19, further comprising:

logic for accumulating the data fragments in a buffer manager; and logic for assembling the data fragments into a frame.

21. The non-transitory computer readable medium of claim 20, further comprising storing statistics associated with the cells in a statistics memory.

22. The non-transitory computer readable medium of claim 21, wherein the statistics are chosen from an idle cell, an unassigned cell, an operation and maintenance (OAM) cell, an AAL 2 cell, an AAL 5 cell, a header error correction (HEC) error cell, a frame count, a byte count, congestion information, AAL5 CRC error count, and resource management (RM) cell count.

23. The non-transitory computer readable medium of claim 22, wherein the statistics are gathered for each unique VPI/VCI cell stream.

24. The non-transitory computer readable medium of claim 23, further comprising logic for periodically providing the statistics to a processor for display.

* * * * *